United States Patent [19]
Fisher

[11] Patent Number: 6,095,341
[45] Date of Patent: Aug. 1, 2000

[54] APPARATUS AND PROCESS FOR SEPARATING CONTAMINANTS FROM PARTICULATE MATERIAL

[75] Inventor: Gene Fisher, Dickinson, N. Dak.

[73] Assignee: Fisher Industries, Dickinson, N. Dak.

[21] Appl. No.: 09/212,523

[22] Filed: Dec. 16, 1998

[51] Int. Cl.⁷ .............................. B03B 5/08; B03B 11/00
[52] U.S. Cl. .......................... 209/429; 209/428; 209/498
[58] Field of Search ................................... 209/429, 428, 209/493, 498, 500

[56] References Cited

U.S. PATENT DOCUMENTS

| | | | |
|---|---|---|---|
| 278,325 | 5/1883 | Farwell | 209/493 |
| 2,612,267 | 9/1952 | Vogel | 209/428 |
| 2,850,166 | 9/1958 | Svensson | 209/500 |
| 2,895,231 | 7/1959 | Sylvest | 209/428 |
| 3,387,709 | 6/1968 | Garland | 209/493 |
| 4,068,758 | 1/1978 | Abdul-Rahman | 209/498 |
| 4,157,957 | 6/1979 | Giffard | 209/493 |
| 4,222,867 | 9/1980 | Garland | 209/500 |
| 4,469,591 | 9/1984 | Coyle et al. | 209/170 |
| 4,946,584 | 8/1990 | Olney | 209/498 |

FOREIGN PATENT DOCUMENTS

| 4231 | of 1892 | United Kingdom | 209/428 |
|---|---|---|---|

*Primary Examiner*—Donald P. Walsh
*Assistant Examiner*—Daniel K Schlak
*Attorney, Agent, or Firm*—Michael S. Neustel

[57] ABSTRACT

An apparatus and process for separating contaminants from particulate material for separating undesirable debris from particulate material such as sand or gravel quickly and efficiently for increasing the production of separated gravel. A conveyor having a frame and a belt with corrugated side walls defining a channel for retaining water. The conveyor includes a second roller adjacent a rear portion of the conveyor, wherein a cornice of the second roller is preferably at an elevation equivalent to an upper edge of the corrugated side walls. At least one dividing member having a front edge, wherein the front edge projects into an upper layer of water within the channel for separating the upper layer from a lower layer of the water. Water is supplied to the channel adjacent the rear portion and a mixture of contaminated rock is supplied thereafter through a delivery chute. The preferred gravel and sand settle to the lower layer of the water while the undesirable debris such as wood, shale, coal and weeds are retained within the upper layer. The front edge of the dividing member separates the upper layer of water containing the undesirable debris from the lower layer of water containing the preferred gravel and sand. The speed of the conveyor is adjusted in proportion to the percentage of contamination. It can be appreciated that this invention is not limited to separating particulate material such as sand or gravel. The present invention may also be utilized for separating crushed rock, gold or any other well-known non-buoyant material.

14 Claims, 3 Drawing Sheets

APPARATUS AND PROCESS FOR SEPARATING CONTAMINANTS FROM PARTICULATE MATERIAL

BACKGROUND OF THE INVENTION

1. Field of the Invention

The present invention relates generally to gravel separating devices and more specifically it relates to an apparatus and process for separating contaminants from particulate material for separating contaminants from particulate material quickly and efficiently for increasing the production of separated particulate material such as sand or gravel. It can be appreciated that this invention is not limited to separating particulate material such as sand or gravel. The present invention may also be utilized for separating crushed rock, gold or any other well-known non-buoyant material.

2. Description of the Prior Art

There are numerous gravel separating devices. For example, U.S. Pat. No. 5,240,114 to Parker et al.; U.S. Pat. No. 5,110,454 to Parker et al.; U.S. Pat. No. 5,224,605 to Neilsen; U.S. Pat. No. 5,476,994 to Trezek; U.S. Pat. No. 5,436,384 to Grant et al.; U.S. Pat. No. 5,429,247 to Lemay et al.; U.S. Pat. No. 5,123,599 to Mardigian; U.S. Pat. No. 5,609,256 to Mankosa all are illustrative of such prior art.

Parker et al. (U.S. Pat. Nos. 5,240,114 and 5,110,454) disclose an apparatus and process for reclaiming gravel, soil particles and wood pieces from a mixture of the same. Jet nozzles produce currents which moves wood pieces over a baffle onto a first conveyor. Rocks from the mixture are not moved over the baffle because of their weight and drop down onto a second conveyor that collects the rock and removes it from the water tank. The design of Parker requires a plurality of nozzles forcing water over the baffle thereby allowing the wood pieces to become engaged to a rock and thereafter fall towards the second conveyor easily providing an unacceptable contamination level.

Neilsen (U.S. Pat. No. 5,224,605) discloses a method and apparatus for separating bark from gravel including. Neilsen teaches a pair of conveyors disposed within a trough declined toward another.

While these devices may be suitable for the particular purpose to which they address, they are not as suitable for separating contaminants from particulate material quickly and efficiently for increasing the production of separated particulate material such as sand or gravel. The prior art does not provide a process or apparatus that rapidly cleans undesirable debris from gravel and sand. Typical gravel cleaning devices utilize slow and inefficient screening methods or slow auger-like cleaners. Though the typical gravel cleaning devices are thorough in cleaning the gravel and sand, they are generally slow. Also, typical gravel cleaning devices are to large to transport to a remote gravel site, thereby requiring loading gravel trucks with a substantial amount of the undesirable debris. The present invention rapidly cleans the undesirable debris from the gravel and sand dependent only upon the percentage of contamination. The present invention is further compact enough that it may be utilized in a remote gravel pit thereby allowing the gravel truck to haul more of the desirable sand and gravel.

In these respects, the apparatus and process for separating contaminants from particulate material according to the present invention substantially departs from the conventional concepts and designs of the prior art, and in so doing provides an apparatus primarily developed for the purpose of separating contaminants from particulate material quickly and efficiently for increasing the production of separated particulate material such as sand or gravel.

SUMMARY OF THE INVENTION

A primary object of the present invention is to provide an apparatus and process for separating contaminants from particulate material that will overcome the shortcomings of the prior art devices.

Another object is to provide an apparatus and process for separating contaminants from particulate material that is compact enough that it allows gravel, sand, crushed rock, gold or other non-buoyant material to be cleaned of undesirable debris at a remote site.

An additional object is to provide an apparatus and process for separating contaminants from particulate material that increases the production of the desirable non-buoyant material by approximately two-fold.

A further object is to provide an apparatus and process for separating contaminants from particulate material that allows a gravel truck to be filled with more gravel and sand because of the removal of undesirable debris prior to loading.

Another object is to provide an apparatus and process for separating contaminants from particulate material that rapidly cleanses the gravel and sand for allowing conventional gravel and sand cleaners to operate faster.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
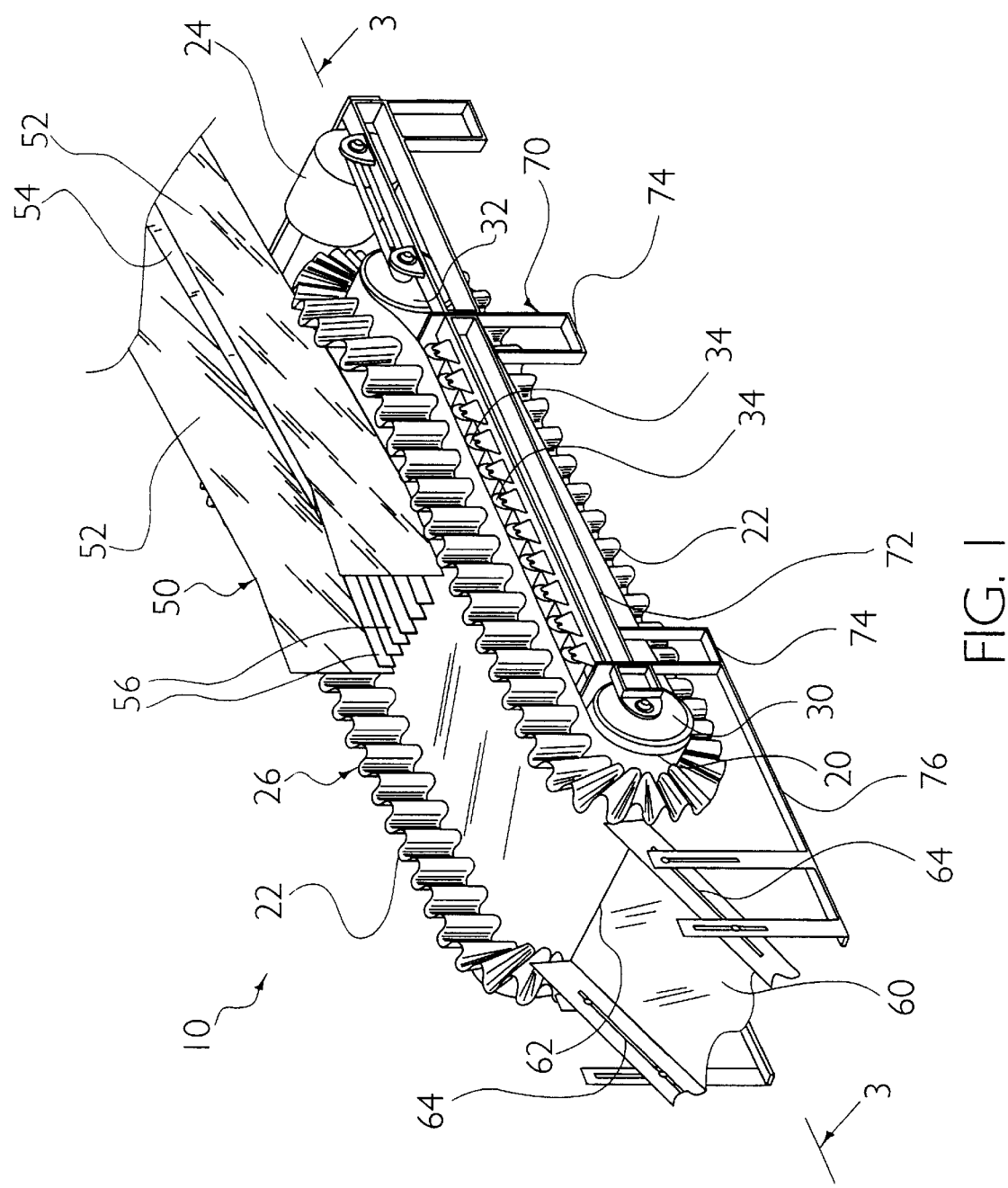
FIG. 1 is an upper perspective view of the present invention.
Figure 2:
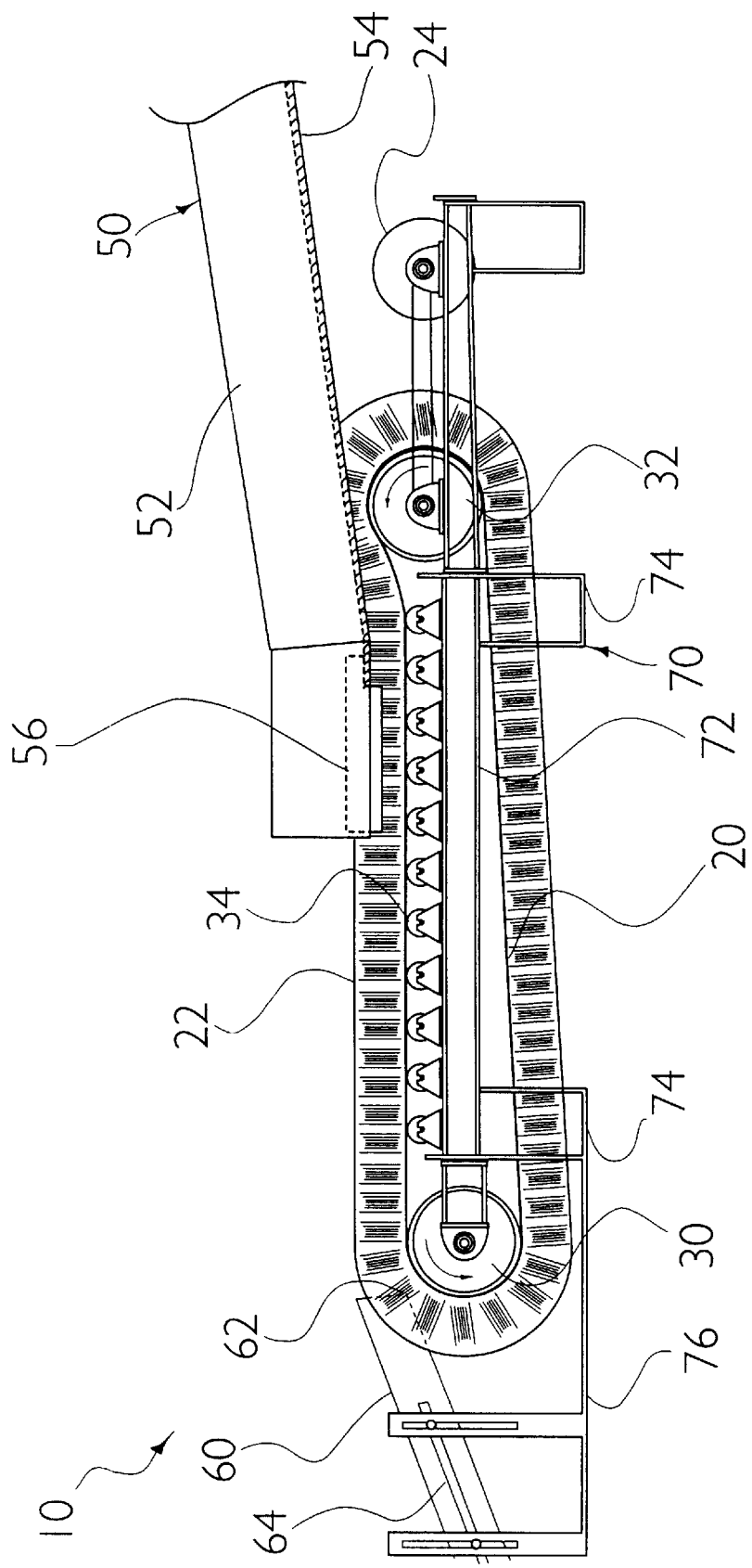
FIG. 2 is a side view of the present invention.
Figure 3:
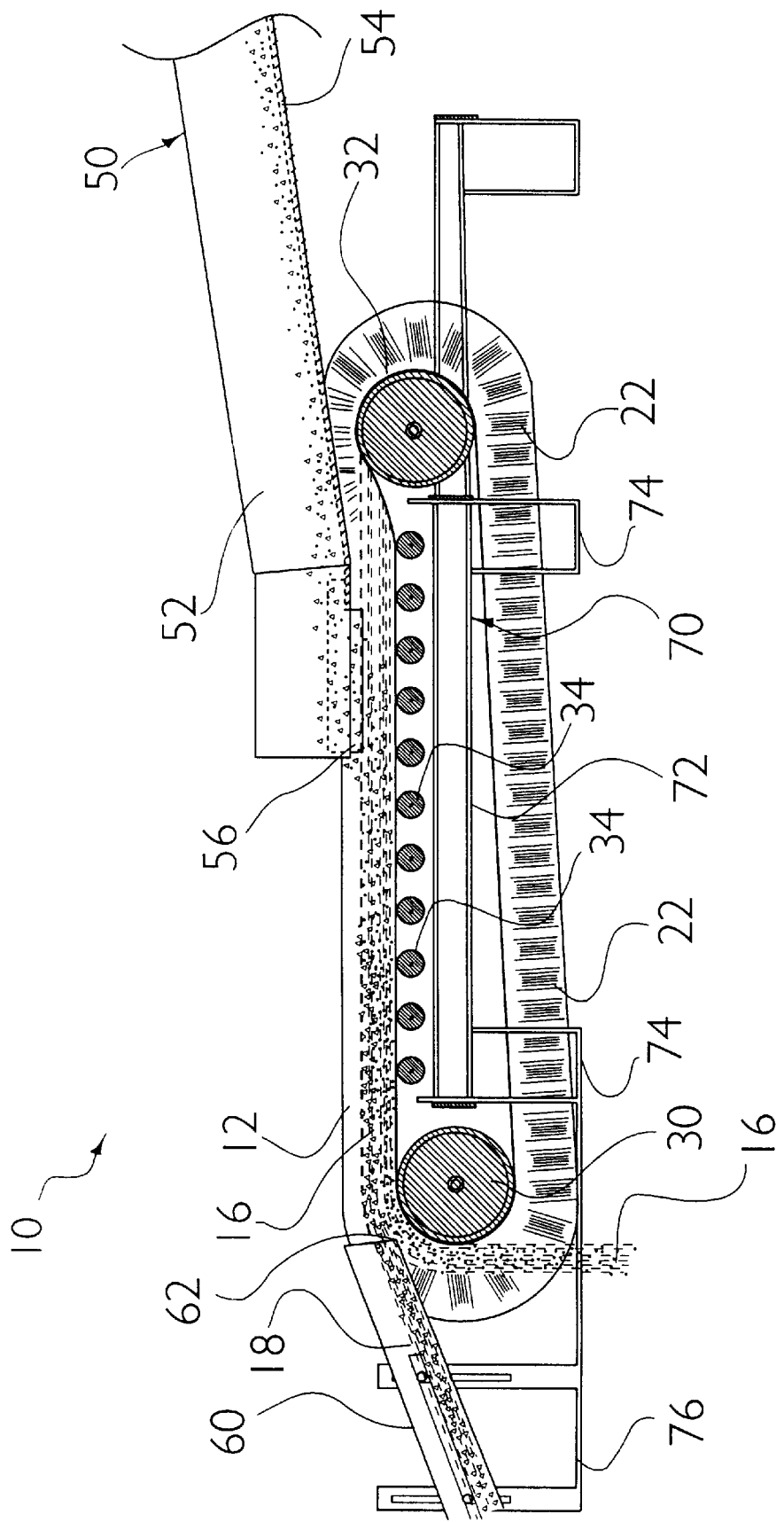
FIG. 3 is a cross sectional view taken along line 3—3 of FIG. 1 disclosing the present invention in operation.

Turning now descriptively to the drawings, in which similar reference characters denote similar elements throughout the several view, FIGS. 1 through 3 illustrate an apparatus and process for separating contaminants from particulate material 10, which comprises a conveyor 26 having a frame 70 and a belt 20 with corrugated side walls 22 defining a channel for retaining water. Alternatively, secured walls would replace the corrugated side walls 22 thereby eliminating the need for the corrugated side walls 22. The conveyor 26 includes a second roller 32 adjacent a rear portion of the conveyor 26, wherein a cornice of the second roller 32 is preferably at an elevation equivalent to an upper edge of the corrugated side walls 22. At least one dividing member 60 is provided having a front edge 62, wherein the front edge 62 projects into an upper layer of water within the channel for separating the upper layer from a lower layer of the water. Water is supplied to the channel adjacent the rear portion and a mixture of contaminated rock 14 is supplied thereafter. The preferred gravel and sand 16 settle to the lower layer of the water while the undesirable debris 18 such as wood, shale, coal and weeds are retained within the upper layer. The front edge 62 of the dividing member 60 separates the upper layer of water containing the undesirable debris 18 from the lower layer of water containing the preferred gravel and sand 16. The speed of the conveyor 26 is adjusted in proportion to the percentage of contamination. It can be appreciated that this invention is not limited to separating particulate material such as sand or gravel. The present invention may also be utilized for separating crushed rock, gold or any other well-known non-buoyant material.

As best shown in FIG. 2 of the drawings, the frame 70 includes a pair of side members 72 distally spaced parallel to one another. The frame 70 further includes a plurality of legs 74 secured orthogonally to the side members 72 for supporting the frame 70. The frame 70 has a first end and a second end. The frame 70 is preferably formed so as to allow placement near or upon a conventional gravel cleaner which would receive the output of the conveyor 26 for further cleaning of the lower layer of water containing the gravel and sand 16. The frame 70 is preferably rotatable so as to allow the first end or the second end to be at a higher elevation with respect to one another. The legs 74 would include an elevating means for elevating the first or second end.

A plurality of support rollers 34 are rotatably secured mesial the pair of side members 72 for moveably supporting a bottom of the belt 20 as best shown in FIGS. 2 and 3 of the drawings. The first roller 30 is rotatably secured to the first end as best shown in FIG. 2. The cornice of the first roller 30 is approximately the same as the cornice of the support rollers 34. The second roller 32 is rotatably secured to the second end as best shown in FIG. 2. The cornice of the second roller 32 is preferably at least as high as an upper ridge of the corrugated side walls 22 so that the water level 12 within the channel does not exceed the belt 20 near the second end of the frame 70. A motor 24 is mechanically connected to the second roller 32 as best shown in FIG. 2 of the drawings. The motor 24 is preferably a variable speed motor 24 so as to allow adjustment of the speed of the belt 20 according to the amount of contamination. The larger the amount of contamination, the slower the motor 24 preferably is operated to allow settling of the preferred gravel and sand 16. The lesser the amount of contamination, the faster the motor 24 preferably is operated.

As shown in FIG. 2 of the drawings, the belt 20 moves from the second roller 32 of the frame 70 to the first roller 30. The water is provided within the channel through a conventional nozzle connected to a conventional water supply pipe. The conventional nozzle and the conventional water supply pipe are not shown in the figures for clarification purposes. The water supply pipe is connected to a continuous supply of clean water for continuously supplying water to the channel. The nozzle is preferably adjustable to allow a steady or turbulent flow of water into the channel depending upon the characteristics of the mixture of contaminated rock 14. The nozzle is preferably positioned between the second roller 32 and the end of the delivery chute 50.

The mixture of contaminated rock 14 is descended into the channel filled substantially with water through a delivery chute 50. The delivery chute 50 is preferably positioned adjacent the nozzle for receiving the maximum amount of time exposure and agitation for the mixture 14. The delivery chute 50 guides the mixture 14 into the most effective position along the channel defined by the belt 20 to achieve the desired agitation of the mixture 14 within the water.

The delivery chute 50 is preferably adjustable in its position to allow placement of the mixture 14 in various positions and heights along the belt 20. The delivery chute 50 may be adjustably connected to the frame 70 or it can be self-supporting. As shown in FIG. 1, the delivery chute 50 preferably includes a pair of delivery walls 52 and a floor 54. Even though not shown, a ceiling can obviously be utilized to completely enclose the delivery chute 50. At the distal end of the delivery chute 50 is attached a plurality of discharge fins 56 as best shown in FIG. 1 of the drawings. As shown in FIGS. 2 and 3, the discharge fins 56 preferably extend downwardly from the floor 54 to partially engage the upper layer of water in the channel. The discharge fins 56 help to evenly discharge the mixture 14 into the channel of the belt 20 with little backwash or disruption to the material on the belt 20. The discharge fins 56 are preferably 1 to 4 inches apart. The discharge fins 56 also cause the water in the channel to rise in the area where the mixture 14 enters the belt 20, thereby assisting increasing the floating effects of the undesirable debris 18.

As best shown in FIG. 1 of the drawings, the dividing member 60 is preferably positioned near the first end of the frame 70 thereby separating the output of water from the belt 20. The dividing member 60 has a front edge 62 which penetrates the water thereby separating the upper layer of the water containing the undesirable debris 18 from the lower layer of the water containing the preferred gravel and sand 16. The dividing member 60 further preferably includes a pair of side walls as shown in FIG. 1 of the drawings. The dividing member 60 guides the upper layer of the water and the undesirable debris 18 away from the conveyor 26 where after it may be filtered using conventional methods for reclamation of any gravel and sand 16 contained within the upper layer of water separated.

As shown in FIGS. 1 through 3 of the drawings, the dividing member 60 is preferably secured adjustably to the frame 70 of the conveyor 26 by a pair of support brackets 76. A plurality of slots 64 project into the pair of side walls of the dividing member 60 and the pair of support brackets 76. An unnumbered fastener projects through the corresponding slots 64 to allow vertical and horizontal adjustment of the dividing member 60 with respect to the conveyor 26. The angle of the dividing member 60 is also adjustable by manipulating the front portion and the rear portion of the dividing member 60 upon the pair of support brackets 76.

In an alternative embodiment, a plurality of dividing members 60 are provided where a first dividing member 60 is positioned near the delivery chute 50 and set to penetrate the water only a short distance so as to remove the lighter of the undesirable debris 18 by separating a first layer. A second dividing member 60 would be provided further along the conveyor 26 penetrating the water further than the first dividing member 60 so as to separate a second layer of water containing the undesirable debris 18. As can be appreciated by one skilled in the art, many more dividing members 60 can be added as required.

In use, water is inputted into the channel of the belt 20 defined by the corrugated side walls 22 near the second end of the conveyor 26. The nozzle is adjusted to achieve a variation of either calm or agitated water output. If the gravel and sand 16 is fine, a calmer water output is desired, whereas if the gravel and sand 16 is course an agitated water output is desired to circulate the gravel and sand 16 with the undesirable debris 18. The undesirable debris 18 is inputted into the water within the channel through the delivery chute 50 positioned adjacent the nozzle. The discharge fins 56 prevent backwash and reduce the turbulence of the entering mixture 14 into the channel of the belt 20. The heavier particles such as the gravel and sand 16 settle toward the lower layer of the water within the channel, while the lighter particles such as the undesirable debris 18 are suspended within the upper layer of the water. The speed of the belt 20 on the conveyor 26 is adjusted according to the amount of contamination. The more contamination present, the slower the belt 20 is operated to allow complete settling of the gravel and sand 16. The dividing member 60 is adjusted so that the front edge 62 penetrates the output of water from the channel so as to separate the upper layer from the lower layer of water and leaving a substantial amount of the gravel and sand 16 within the lower layer. The upper layer containing the undesirable debris 18 is guided through the dividing member 60 away from the conveyor 26 where after it may be filtered again through a conventional gravel cleaner for reclamation of any gravel and sand 16 inadvertently separated into the upper layer of the water. The lower layer of water containing the preferred gravel and sand 16 is allowed to descend into a collecting device or another conventional gravel cleaner for further cleaning of the gravel and sand 16. The above process is preferably utilized in conjunction with an existing conventional gravel cleaner where it increases production of gravel and sand up to twofold.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A material separator for separating a mixture of buoyant material and nonbuoyant material into its component parts, comprising:
    a conveyor having a frame, a plurality of rollers and a belt, wherein said conveyor has an input end and a discharge end;
    a wall means on each side of said belt defining a channel therebetween for retaining and guiding a flow of water;
    a water delivery means for delivering water into said channel;
    a material delivery means for delivering said mixture into said channel;
    wherein said material delivery means is positioned at a location generally above said channel of said belt, wherein said buoyant material is suspended within said water and said nonbuoyant material is supported on said belt and within a lower portion of said water;
    wherein said delivery means comprises:
        a floor extending substantially parallel to said belt, said floor having a front edge;
        a pair of delivery walls attached about opposing sides of said floor for retaining said mixture; and
        at least one discharge fin attached to said floor, extending beyond said front edge of said floor and positioned at least partially within said water, for evenly distributing said mixture into said water; and
    a separating means adjustably secured to said conveyor for separating at least one layer from said water.

2. The material separator of claim 1, wherein said conveyor includes an elevating means for elevating either said input end or said discharge end.

3. The material separator of claim 1, wherein said plurality of rollers include an input roller rotatably attached to said frame adjacent said input end, wherein a cornice of said input roller is higher than a cornice of said plurality of support rollers.

4. The material separator of claim 1, wherein said separating means comprises at least one planar member having a pair of opposing side walls adjustably secured to said frame of said conveyor, wherein said planar member includes a front edge for penetrating at least one layer of said water.

5. The material separator of claim 4, wherein said water delivery means delivers said water at an adjustable agitation.

6. The material separator of claim 5, wherein said water delivery means comprises at least one adjustable nozzle.

7. The material separator of claim 1, wherein said wall means comprises a pair of corrugated side walls attached near opposing edges of said belt.

8. A material separator for separating a mixture of buoyant material and nonbuoyant material into its component parts, comprising:
    a conveyor having a frame, a plurality of rollers and a belt, wherein said conveyor has an input end and a discharge end;
    a wall means on each side of said belt defining a channel therebetween for retaining and guiding a flow of water;
    a water delivery means for delivering water into said channel;
    a delivery chute adjustably positionable above said channel of said belt for delivering said mixture into said channel, wherein said buoyant material is suspended within said water and said nonbuoyant material is supported on said belt and within a lower portion of said water;
    wherein said delivery chute comprises:
        a floor extending substantially parallel to said belt, said floor having a front edge;
        a pair of delivery walls attached about opposing sides of said floor for retaining said mixture; and
        at least one discharge fin attached to said floor, extending beyond said front edge of said floor and positioned at least partially within said water for evenly distributing said mixture into said water; and
    a separating means adjustably secured to said conveyor for separating at least one layer from said water.

9. The material separator of claim 8, wherein said conveyor includes an elevating means for elevating either said input end or said discharge end.

10. The material separator of claim 8, wherein said plurality of rollers include an input roller rotatably attached to said frame adjacent said input end, wherein a cornice of said input roller is higher than a cornice of said plurality of support rollers.

11. The material separator of claim 8, wherein said separating means comprises at least one planar member having a pair of opposing side walls adjustably secured to said frame of said conveyor, wherein said planar member includes a front edge for penetrating at least one layer of said water.

12. The material separator of claim 11, wherein said water delivery means delivers said water at an adjustable agitation.

13. The material separator of claim 12, wherein said water delivery means comprises at least one adjustable nozzle.

14. The material separator of claim 8, wherein said wall means comprises a pair of corrugated side walls attached near opposing edges of said belt.

* * * * *